United States Patent
Dannoux et al.

(10) Patent No.: US 8,573,005 B2
(45) Date of Patent: Nov. 5, 2013

(54) APPARATUS AND METHOD FOR MASS PRODUCING 3D ARTICLES FROM 2D GLASS-CONTAINING SHEETS

(75) Inventors: Thierry Luc Alain Dannoux, Avon (FR); Paul Delautre, Lisses (FR); Frederic Henri Florent, Fontainebleau (FR); Allan Mark Fredholm, Vulaines sur Seine (FR); Patrick Jean Pierre Herve, Avon (FR); Jean-Pierre Henri Rene Lereboullet, Bois le Roi (FR); Stephane Poissy, Brunoy (FR)

(73) Assignee: Corning Incorporated, Corning, NY (US)

( * ) Notice: Subject to any disclaimer, the term of this patent is extended or adjusted under 35 U.S.C. 154(b) by 44 days.

(21) Appl. No.: 13/033,817

(22) Filed: Feb. 24, 2011

(65) Prior Publication Data

US 2012/0216573 A1 Aug. 30, 2012

(51) Int. Cl.
*C03B 23/023* (2006.01)
*C03B 23/025* (2006.01)
*C03B 23/03* (2006.01)

(52) U.S. Cl.
CPC .......... *C03B 23/023* (2013.01); *C03B 23/0252* (2013.01); *C03B 23/03* (2013.01)
USPC ................ 65/106; 65/182.2; 65/287

(58) Field of Classification Search
CPC .... C03B 23/023; C03B 23/0252; C03B 23/03
USPC ............... 65/25.2, 25.4, 106, 182.2
See application file for complete search history.

(56) References Cited

U.S. PATENT DOCUMENTS

| | | | | |
|---|---|---|---|---|
| 3,223,501 | A | * 12/1965 | Fredley et al. | 65/25.2 |
| 3,375,093 | A | * 3/1968 | Reising | 65/25.4 |
| 3,468,645 | A | * 9/1969 | McMaster et al. | 65/25.4 |
| 3,665,730 | A | 5/1972 | Linzer | |
| 3,723,085 | A | 3/1973 | McMaster | |
| 4,204,845 | A | * 5/1980 | Shields et al. | 65/25.2 |
| 5,992,178 | A | * 11/1999 | Kuster | 65/24 |
| 6,336,775 | B1 | 1/2002 | Morita et al. | |
| 6,363,751 | B1 | * 4/2002 | Hirotsu et al. | 65/182.2 |
| 2004/0107729 | A1 | * 6/2004 | Fukami et al. | 65/25.4 |
| 2008/0190143 | A1 | * 8/2008 | Balduin et al. | 65/106 |
| 2009/0302511 | A1 | 12/2009 | Akilian et al. | |

FOREIGN PATENT DOCUMENTS

| | | |
|---|---|---|
| EM | 1826186 A2 | 8/2007 |
| EP | 0241355 A1 | 10/1987 |
| WO | 0162680 A1 | 8/2001 |
| WO | 2010002446 A1 | 1/2010 |
| WO | 2010061238 A1 | 6/2010 |
| WO | 2010065349 A1 | 6/2010 |
| WO | 2010065371 A1 | 6/2010 |

* cited by examiner

*Primary Examiner* — Christina Johnson
*Assistant Examiner* — Cynthia Szewczyk
(74) *Attorney, Agent, or Firm* — Robert P. Santandrea

(57) ABSTRACT

An apparatus for mass production of 3D articles from 2D glass-containing sheets includes a heating section having a heating station that includes a heating chamber adapted to receive a 2D glass-containing sheet, a pneumatic bearing system proximate to the heating chamber for suspending the 2D glass-containing sheet inside the heating chamber, and a heater system proximate to the heating chamber for supplying heat to the heating chamber. A forming section downstream of the heating section has a forming station that includes a mold system adapted to shape a heated 2D glass-containing sheet into a 3D article. A cooling section downstream of the forming section has a cooling chamber adapted to controllably cool off one or more 3D articles. A method of mass producing 3D articles from 2D glass-containing sheets involves use of the apparatus.

22 Claims, 5 Drawing Sheets

APPARATUS AND METHOD FOR MASS PRODUCING 3D ARTICLES FROM 2D GLASS-CONTAINING SHEETS

BACKGROUND

Methods for producing three-dimensional (3D) articles by thermally reforming two-dimensional (2D) glass sheets are known from, for example, International Publication Numbers WO2010/002446, WO2010/061238, WO2010/065371, and WO2010/065349, all by Corning Incorporated et al. These methods generally involve loading a 2D glass sheet onto a relatively cold mold, heating the mold and the 2D glass sheet to an elevated temperature at which the glass sheet can be deformed, shaping the 2D glass sheet into a desired 3D article using the mold, cooling the 3D article in the mold, and unloading the 3D article from the mold. These methods have in common a very long residence time of the glass in the mold, i.e., from the time the glass is loaded into the mold to the time the glass is unloaded from the mold. Typical residence times are between 6 minutes and 1 hour. Mass production of 3D articles using these methods would have a low throughput and require a large number of molds.

SUMMARY

In one aspect of the present invention, an apparatus for mass producing 3D articles from 2D glass-containing sheets comprises a heating section comprising a heating station. The heating station comprises a heating chamber adapted to receive a 2D glass-containing sheet, a pneumatic bearing system proximate to the heating chamber for suspending the 2D glass-containing sheet inside the heating chamber, and a heater system proximate to the heating chamber for supplying heat to the heating chamber. The apparatus further includes a forming section downstream of the heating section. The forming section comprises a forming station. The forming station comprises a mold system adapted to shape a heated 2D glass-containing sheet into a 3D article. The apparatus further includes a cooling section downstream of the forming section. The cooling section comprises a cooling chamber adapted to controllably cool off one or more 3D articles.

In one embodiment, the apparatus further comprises a preheating section upstream of the heating section, and the preheating section comprises a preheating chamber adapted to receive one or more 2D glass-containing sheets and a heating system proximate to the preheating chamber for supplying heat to the preheating chamber.

In one embodiment, the apparatus further comprises a conveyor disposed inside the preheating chamber for moving the one or more 2D glass-containing sheets along the preheating chamber.

In one embodiment, the apparatus further comprises means for transferring a preheated 2D glass-containing sheet from the preheating section to the heating section, means for transferring a heated 2D glass-containing sheet from the heating section to the forming section, and means for transferring a 3D article from the forming section to the cooling section.

In one embodiment, the apparatus further comprises a conveyor disposed inside the cooling chamber for moving the one or more 3D articles along the cooling chamber.

In one embodiment, the apparatus further comprises means for transferring a heated 2D glass-containing sheet from the heating section to the forming section and means for transferring a 3D article from the forming section to the cooling section.

In one embodiment, the means for transferring a heated 2D glass-containing sheet from the heating section to the forming section includes a mechanism for selectively creating a pneumatic ram effect in the heating chamber that ejects the heated 2D glass-containing sheet from the heating chamber.

In one embodiment, the mechanism for selectively creating a pneumatic ram effect comprises a door, shutter, or gate mounted at an inlet of the heating chamber, where the door, shutter, or gate is operable to open or close the inlet of the heating chamber.

In one embodiment, the pneumatic bearing system comprises a pair of opposed pneumatic bearings, and the heating system of the heating section comprises a pair of opposed heaters.

In one embodiment, the heating section further comprises a pair of actuators disposed in the heating chamber and controllable to define an area within the heating chamber where a 2D glass-containing sheet is constrained while being heated within the heating chamber.

In one embodiment, the heating section of the apparatus comprises at least one additional heating station and means for transferring a heated 2D glass-containing sheet from one heating station to another heating station.

In one embodiment, the forming section comprises at least one additional forming station.

In one embodiment, the forming stations are mounted on a rotatable support to enable selective alignment of the each forming station with the heating section.

In one embodiment, the mold system comprises a first mold having a cavity defined by a first 3D surface.

In one embodiment, at least one vacuum port is provided in the mold for applying vacuum to the first 3D surface.

In one embodiment, the mold system comprises a second mold having a protrusion defined by a second 3D surface, where the protrusion is adapted to be received in the cavity defined by the first 3D surface.

In one embodiment, at least one vacuum port is provided in at least one of the first and second molds for applying vacuum to at least one of the first and second 3D surfaces.

In another aspect of the present invention, a method of mass producing 3D articles from 2D glass-containing sheets comprises periodically loading a 2D glass-containing sheet into a preheating chamber and heating the 2D glass-containing sheet to a first temperature. The method further includes periodically transferring a preheated 2D glass-containing sheet from the preheating chamber into a heating chamber, suspending the preheated 2D glass-containing sheet inside the heating chamber by pneumatic pressure, and heating the preheated 2D glass-containing sheet to a second temperature range higher than the first temperature. The method further includes periodically ejecting a heated 2D glass-containing sheet from the heating chamber into a mold system and forming the heated 2D glass-containing sheet into a 3D shape in the mold system. The method further includes periodically unloading a 3D article from the mold system into a cooling chamber and controllably cooling off the 3D article to a third temperature lower than the second temperature.

In one embodiment, forming the heated 2D glass-containing sheet comprises one of pressing, vacuum sagging, and pressure forming the heated 2D glass-containing sheet.

In one embodiment, periodically unloading a 3D article comprises (i) vacuum clamping the 3D article to a mold surface, releasing the 3D article onto a support, and transferring the support and 3D article to the cooling chamber or (ii) grabbing the 3D article with a vacuum chuck, releasing the 3D article onto a support, and transferring the support and 3D article to the cooling chamber.

In one embodiment, the method further comprises coordinating the timing of the steps of the method such that 3D articles are produced from 2D glass-containing sheets substantially continuously over a selected time period.

Other aspects of the present invention will be apparent from the following description and the appended claims.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
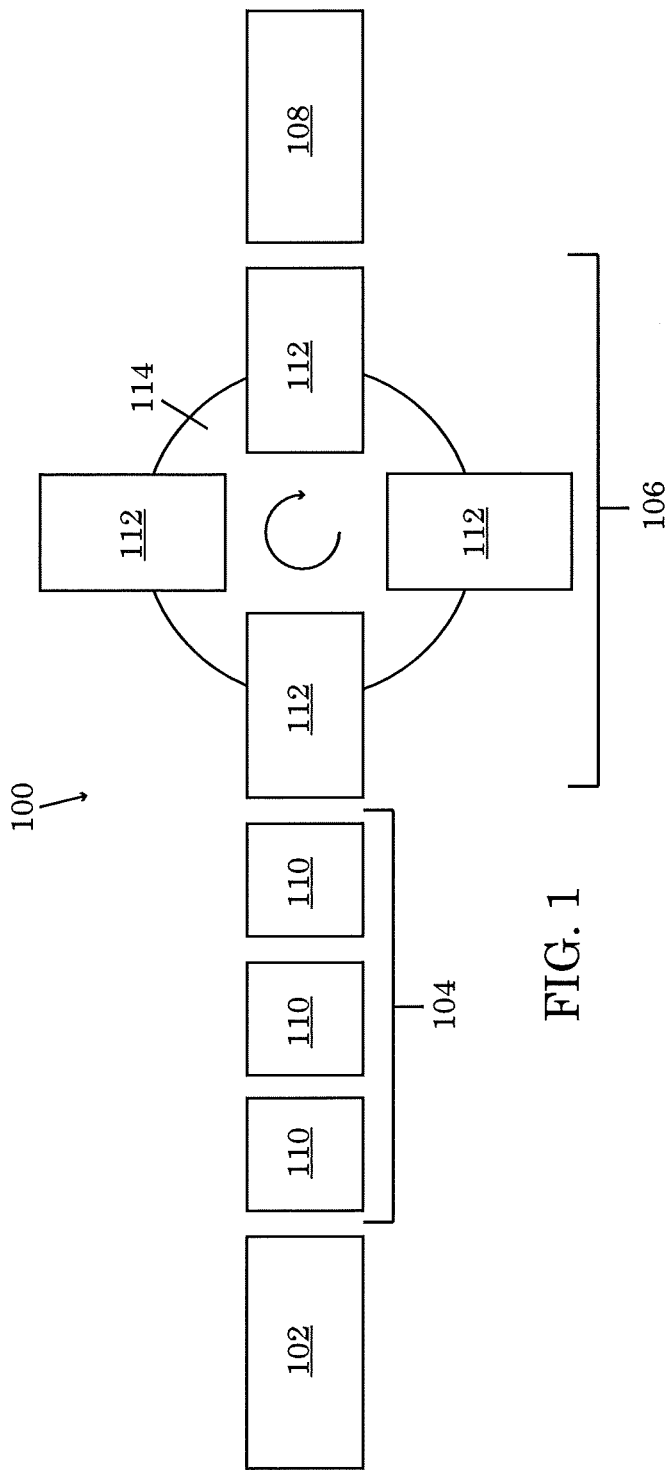
FIG. 1 is a block diagram of an apparatus for producing 3D articles from 2D glass-containing sheets.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

In FIG. 1, an apparatus 100 for mass producing 3D articles from 2D glass-containing sheets includes a preheating section 102, a heating section 104, a forming section 106, and a cooling section 108. The heating section 104 is located downstream of the preheating section 102, the forming section 106 is located downstream of the heating section 104, and the cooling section 108 is located downstream of the forming section 106. 2D glass-containing sheets are loaded into the preheating section 102, heated in the preheating section 102 to a certain temperature, passed on to the heating section 104 for additional heating, and then passed on to the forming section 106 for forming into 3D articles. The 3D articles are passed on to the cooling section 108 for controlled cooling off. In one embodiment, the preheating section 102, heating section 104, forming section 106, and cooling section 108 are designed such that production of the 3D articles is substantially continuous over a selected time period.

Every time interval $T_1$, the preheating section 102 receives a 2D glass-containing sheet from an external source. The 2D glass-containing sheet may be a 2D glass sheet or a 2D glass-ceramic sheet. The length of the preheating section 102 is such that the preheating section 102 can accommodate a plurality of 2D glass-containing sheets at the same time. Typically, the 2D glass-containing sheets are cold, e.g., at room temperature, when loaded into the preheating section 102. The preheating section 102 heats the 2D glass-containing sheets it receives to a preheated temperature within a first temperature range. In one embodiment, the first temperature range is defined as $[T_a-\delta_1, T_a+\delta_2]$, where $T_a$ is the annealing point and $\delta_1$, $\delta_2$ are some step temperatures away from the annealing point, where $\delta_1$ and $\delta_2$ may or may not be the same. Alternatively, the first temperature range could be defined as the temperature range at which the viscosity of the 2D glass-containing sheets is in a range from $10^{13}$ Poise to $10^{16}$ Poise.

Every time interval $T_2$, the heating section 104 receives a preheated 2D glass-containing sheet from the preheating section 102 and heats the preheated 2D glass-containing sheet to a forming temperature within a second temperature range. The forming temperature is greater than the preheated temperature. In one embodiment, the second temperature range is defined as $[T_a, T_s]$, where $T_a$ is the annealing point of the 2D glass-containing sheet and $T_s$ is the softening point of the 2D glass-containing sheet. Alternatively, the second temperature range could be defined as the temperature range at which the viscosity of the 2D glass-containing sheet is in a range from $10^8$ Poise to $2 \times 10^{10}$ Poise. The heating section 104 includes one or more heating stations 110. The heating of the 2D glass-containing sheets occur inside the heating stations 110. When the heating section 104 includes more than one heating station 110, heating of the 2D glass-containing sheet may be shared among the heating stations 110. Each heating station 110 can be controlled to deliver a certain amount of heat to the 2D glass-containing sheet so that at the end of the heating section 104 the 2D glass-containing sheet is at the desired forming temperature. The amount of heat delivered by the individual heating stations 110 may or may not be the same, i.e., the amount of heat delivered by a heating station may either be the same or may differ from that delivered by other heating stations.

Every time interval $T_3$, the forming section 106 receives a heated 2D glass-containing sheet at forming temperature from the heating section 104. In the forming section 106, the heated 2D glass-containing sheet is shaped (or formed) into a 3D article. Any suitable mold-based shaping (or forming) method may be used to shape the 2D glass-containing sheet into the 3D article. Examples of mold-based shaping processes include pressing, pressure forming, and vacuum sagging. The forming section 106 includes one or more forming stations 112, where the shaping of the 2D glass-containing sheet occurs inside the forming stations 112. When the forming section 106 includes more than one forming station 112, the forming stations 112 may be mounted on a rotatable support or carousel 114 in a radial pattern. Every time interval $T_4$, the carousel 114 rotates so that a forming station 112 can be aligned with the heating section 104 to receive a heated 2D glass-containing sheet from the heating section 104.

Every time interval $T_5$, the cooling section 108 receives a 3D article from the forming section 106. The length of the cooling section 108 is such that the cooling section 108 can accommodate a plurality of 3D articles at the same time. The cooling section 108 allows controlled cooling off of the 3D articles it receives to a handling temperature in a third temperature range. In one embodiment, the third temperature range is defined as the temperature range at which the viscosity of the 3D article is greater than $10^{13}$ Poise. Where the forming section 106 has multiple forming stations 112, there is more flexibility in when to load a 2D glass-containing sheet from the heating section 104 into the forming section 106 and when to unload a 3D article from the forming section 106 into the cooling section 108. For example, it is possible to load a 2D glass-containing sheet from the heating section 104 into a first forming station 112 before, while, or after unloading a 3D article from a second forming station 112 into the cooling section 108. All the time intervals mentioned above and geometrical and thermal characteristics of the sections of the apparatus 100 can be selected so that production of the 3D articles is substantially continuous over a selected time period.

Figure 2:
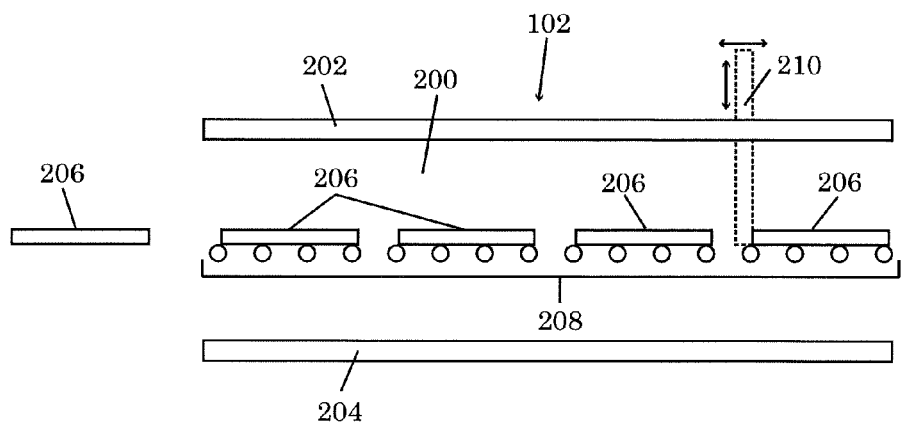
FIG. 2 is a detailed diagram of a preheating section.

In FIG. 2, the preheating section 102 includes a preheating chamber 200 and a heating system having heaters 202, 204 proximate to and on opposite sides of the preheating chamber 200. The heaters 202, 204 are for heating 2D glass-containing sheets 206 inside the preheating chamber 200. Each of the heaters 202, 204 may comprise one or more heating elements. Any suitable heaters or heating elements may be used. A conveyor 208, such as a roll conveyor or any other suitable linear travel mechanism, is disposed in the preheating chamber 200 to transport the 2D glass-containing sheets 206 along the preheating chamber 200. The 2D glass-containing sheets 206 can be loaded into the preheating chamber 200 from the upstream (left) side of the preheating section 102 and off-loaded from the preheating chamber 200 from the downstream (right) side of the preheating section 102. A retractable push mechanism 210 may be selectively inserted into the preheating chamber 200 and used to push the 2D glass-containing sheets out of the preheating section 102 into the heating section (104 in FIG. 1).

Figure 3:
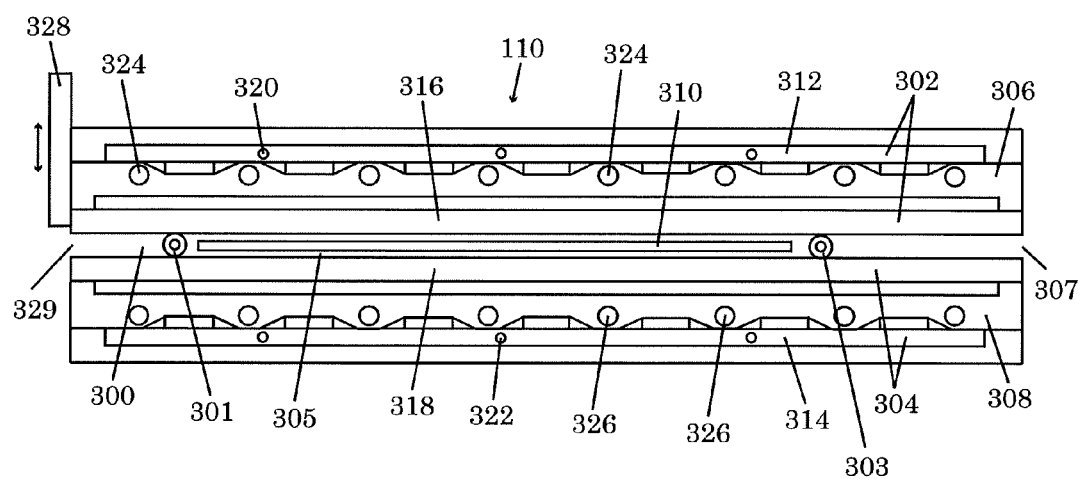
FIG. 3 is a detailed diagram of a heating station.

In FIG. 3, each heating station 110 includes a heating chamber 300, a pneumatic bearing system having a pair of pneumatic bearings 302, 304, e.g., air bearings, proximate to and on opposite sides of the heating chamber 300. The heating station 110 also includes a heating system having a pair of heaters 306, 308 proximate to and on opposite sides of the heating chamber 300. The pneumatic bearings 302, 304 are for suspending a 2D glass-containing sheet 310 in the heating chamber 300. The heaters 306, 308 are for heating the 2D glass-containing sheet 310 in the heating chamber 300. The heaters 306, 308 include a plurality of heating elements 324, 326, respectively, although it is possible for each of the heaters 306, 308 to include only a single heating element. The pneumatic bearings 302, 304 suspend the 2D glass-containing sheet 310 in the heating chamber 300 without making physical contact with the 2D glass-containing sheet 310. This helps preserve the surface quality of the 2D glass-containing sheet 310 when the 2D glass-containing sheet 310 is heated to the higher forming temperature where surface stickiness is of concern because of the lower glass viscosity. Each of the pneumatic bearings 302, 304 have plenums 312, 314 and porous plates 316, 318, respectively. The plenums 312, 314 have inlet ports 320, 322 that can be connected to a pneumatic fluid source, e.g., an air source. The pneumatic fluid in the plenums 312, 314 is discharged to the porous plates 316, 318 and distributed through the porous plates 316, 318 to the heating chamber 300. The porous plates 316, 318 may be a plate of porous material, e.g., mullite. Alternatively, the porous plates 316, 318 may be plates in which pores are formed. It is possible for the pneumatic bearing system to have only one pneumatic bearing instead of two opposed pneumatic bearing. However, the 2D glass-containing sheet may be prone to distortion if only one pneumatic bearing is used. The two opposed pneumatic bearings exert opposing pneumatic forces on the opposite surfaces of the 2D glass-containing sheet. These opposing forces are balanced so that distortion of the 2D glass-containing sheet is minimized.

Each heating station 110 in the heating section (104 in FIG. 1) receives a 2D glass-containing sheet 310 from the preheating section (102 in FIG. 1) or from a preceding heating station (110 in FIG. 1). Once inside each heating station 110, the 2D glass-containing sheet 310 is suspended inside the heating chamber 300 by pneumatic pressure, as explained above, and heated to an elevated temperature. The elevated temperature may or may not be a forming temperature depending on the location of the heating station 110 in the heating section (104 in FIG. 1) or the number of heating stations 110 in the heating section (104 in FIG. 1). However, at the last heating station 110 in the heating section (104 in FIG. 1), the 2D glass-containing sheet 310 would have the desired forming temperature.

In one embodiment, each heating station 110 includes an ejector mechanism to assist in ejecting the 2D glass-containing sheet 310 from the heating chamber 300 into the next heating station (110 in FIG. 1) or forming section (106 in FIG. 1) without touching the 2D glass-containing sheet. As mentioned above, stickiness of the glass is of concern at the forming temperature. Therefore, it is desirable to avoid touching the surfaces of the 2D glass-containing sheet, at least in the quality area of the 2D glass-containing sheet. In one embodiment, the ejector mechanism includes a door or shutter or gate 328 mounted at the upstream (left) end of each heating station 110. The door, shutter, or gate 328 can be moved in one direction to temporarily seal off the opening 329 at the upstream end of the heating station 110 and thereby create a pneumatic ram effect within the heating chamber 300 of the heating station 110 that would eject the 2D glass-containing sheet from the heating chamber 300. The ejection speed is determined by the pneumatic pressure within the heating chamber 300 after the door, shutter, or gate 328 is closed, and the pneumatic pressure within the heating chamber 300 at any time is determined by the pneumatic bearings 302, 304. The pneumatic pressure within the heating chamber 300 can be adjusted by changing the height of the gaps between the porous plates 316, 318 and the 2D glass-containing sheet 310 and by changing the rate at which pneumatic fluid is supplied to the plenums 312, 314. In general, the ejection speed should be high enough to propel the 2D glass-containing sheet to the next heating station 110 or forming section (106 in FIG. 1), but should not be too high as to result in the 2D glass-containing sheet rebounding or striking unintended objects. After the 2D glass-containing sheet 310 has been ejected from the heating chamber 300, the door, shutter, or gate 328 can be moved in another direction to unseal the upstream (left) end of the heating station 110 and thereby remove the pneumatic ram effect as well as allow another 2D glass-containing sheet to be loaded into the heating station 110.

In one embodiment, a pair of actuators 301, 303, such as linear actuators, are located in the heating chamber 300 to confine movement of the 2D glass-containing sheet to a defined area 305 within the heating chamber 300 while the 2D glass-containing sheet is being heated within the heating chamber 300. Without the actuators 301, 303, the 2D glass-containing sheet 310 will be free to move all along the heating chamber 300. If there are irregularities in the temperature homogeneity in the heating chamber 300, each new 2D glass-containing sheet 310 received in the heating chamber 300 will experience a different heating than the previous 2D glass-containing sheet 310 received in the heating chamber 300. By constraining each 2D glass-containing sheet 310 received in the heating chamber 300 within the same area 305 of the heating chamber 300, each 2D glass-containing sheet 310 received in the heating chamber 300 will experience approximately the same heating. The spacing between the actuators 301, 303 is generally slightly greater than the length of the 2D glass-containing sheet 310, e.g., 5% to 35% greater, the length being defined as the dimension of the 2D glass-containing sheet 310 to be constrained between the actuators 301, 303. In general, the spacing between the actuators 301, 303 will be selected to achieve the desired reproducibility of heating within the constraints of the length of the heating chamber 300. The distance between the actuator 303 closest to the exit side 307 of the heating chamber 300 and the exit side 307 of the heating chamber 300 should be sufficient to provide a guiding length to the 2D glass-containing sheet 310 during ejection of the 2D glass-containing sheet 310 from the heating chamber 300. The ejection of the 2D glass-containing sheet 310 from the heating chamber 300 begins with retracting the actuator 303 to open a pathway for ejection of the 2D glass-containing sheet 310. After the pathway is open, the door, shutter, or gate 328 is closed to create the pneumatic ram effect described above.

Figure 4A:
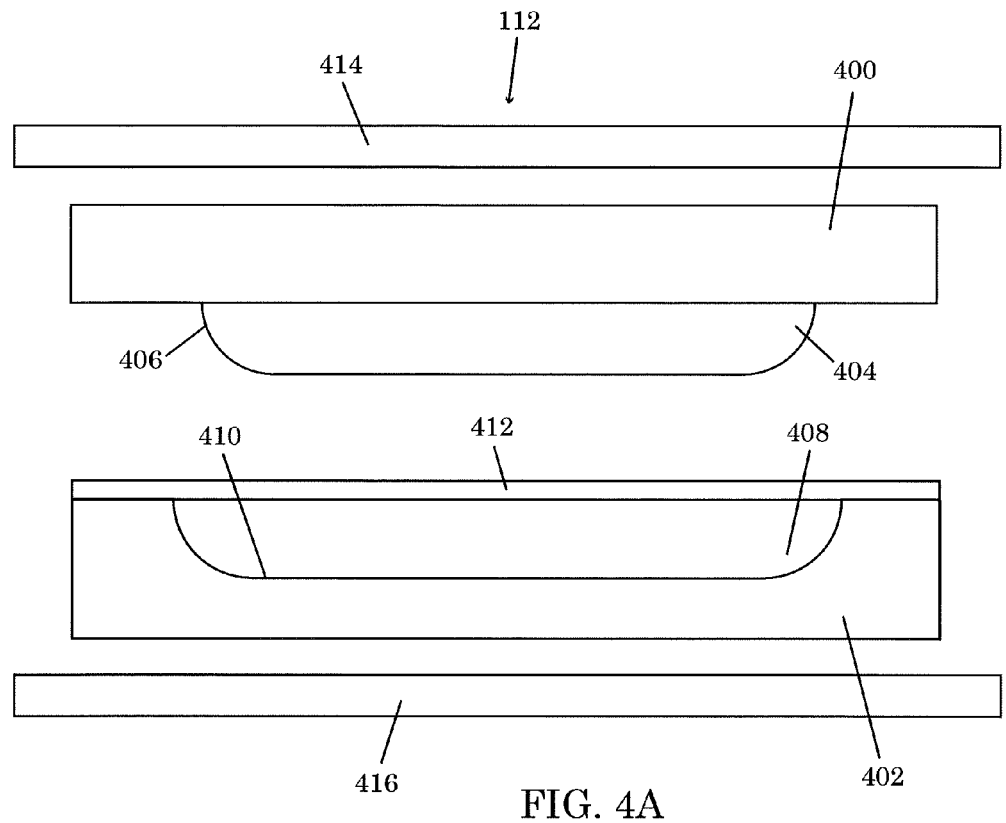
FIG. 4A is a detailed diagram of a forming station.

The configuration of the forming station (112 in FIG. 1) depends on the method to be used in shaping the 2D glass-containing sheet into a 3D article. In FIG. 4A, the forming station 112 is configured for forming a 3D article from a 2D glass-containing sheet by pressing. The forming station 112 includes opposed plunger mold (or top mold) 400 and cavity mold (or bottom mold) 402. The plunger mold 400 includes a protrusion 404 defined by a 3D surface 406. The cavity mold 402 includes a cavity 408 defined by a 3D surface 410. The 3D surface 406 of the protrusion 404 will shape the inner surface of the 3D article to be formed, and the 3D surface 410 of the cavity 408 will shape the outer surface of the 3D article to be formed. The protrusion 404 is sized to be received in the cavity 408. To form the 3D article, a 2D glass-containing sheet 412 is placed on the cavity mold 402. Features such as alignment pins can be used to precisely place the 2D glass-containing sheet 412 on the cavity mold. Then, the plunger mold 400 is used to press the 2D glass-containing sheet 412 into the cavity 408. Heaters 414, 416 may be provided to heat the molds 400, 402 so that the 2D glass-containing sheet 412 is not contacted by cold molds. The molds 400, 402 do not have to be as hot as the 2D glass-containing sheet 412.

Figure 4B:
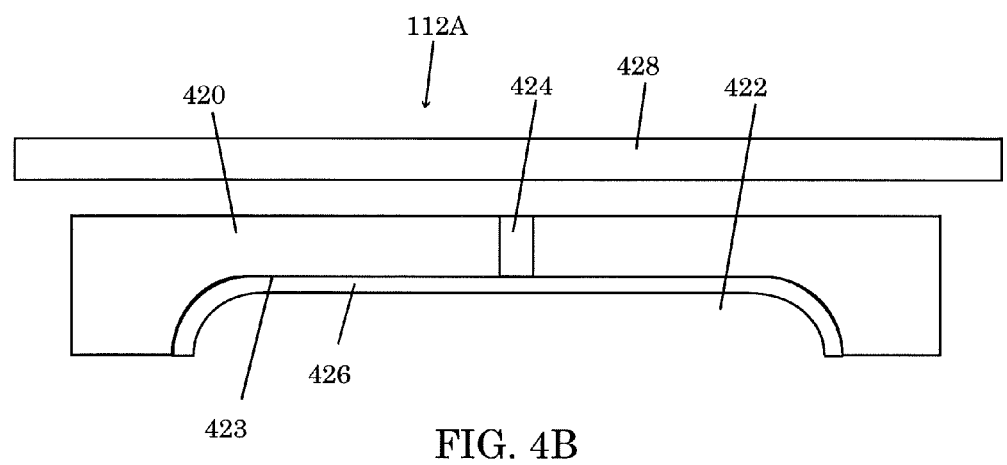
FIG. 4B is another detailed diagram of a forming station.

In FIG. 4B, a forming station 112A is configured for forming a 3D article from a 2D glass-containing sheet by pressure forming. The forming station 112A has a cavity mold 420 having a cavity 422 defined by a 3D surface 423. The orientation of the cavity mold 420 is upside down. At least one vacuum port 424 is provided in the cavity mold 420 for applying vacuum to the cavity 422 or 3D surface 423. When a 2D glass-containing sheet is ejected into the forming station 112A, the 2D glass-containing sheet is pulled upward into the cavity 422 by vacuum, thereby forming the 3D article 426. A heater 428 is provided to heat the mold 420. The mold 420 need not be as hot as the 2D glass-containing sheet formed into the 3D article 426. Although not shown, a support having a cavity may be placed below the cavity mold 420 and used to support the 2D glass-containing sheet prior to the 2D glass-containing sheet being pulled into the cavity 422 by vacuum. Also, the cavity mold 420 may be replaced by a plunger mold, such as shown at 400 in FIG. 4A. The plunger mold used in the forming station 112A would have at least one vacuum port, similar to vacuum port 424, for applying vacuum to the shaping surface of the mold. When vacuum is applied through the vacuum port, the 2D glass-containing sheet will be pulled up against the shaping surface. In the case of the plunger mold, the shaping surface is not in a cavity but on a protrusion.

Figure 4C:
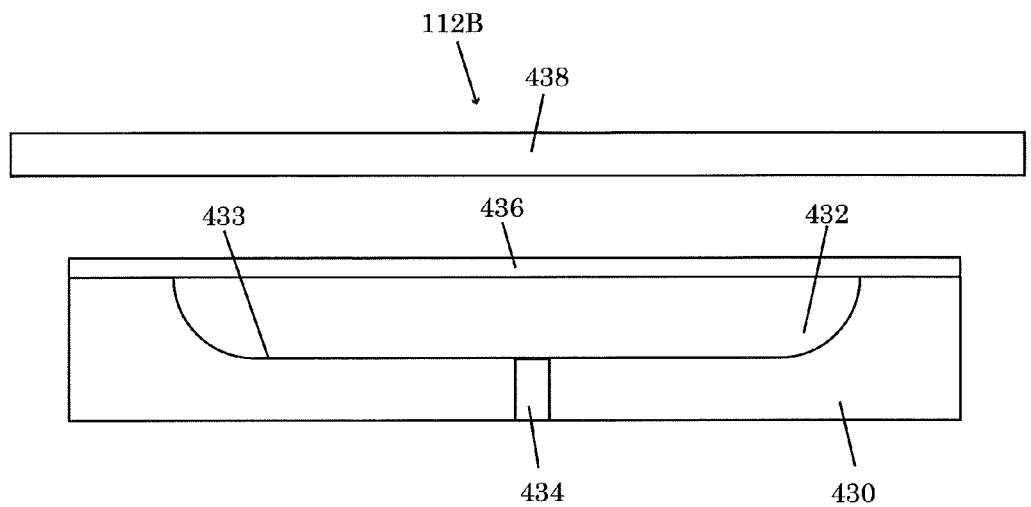
FIG. 4C is another detailed diagram of a forming station.

In FIG. 4C, a forming station 112B is configured for forming a 3D article from a 2D glass-containing sheet by vacuum sagging. The forming station 112B has a cavity (sag) mold 430 having a cavity 432 defined by a 3D surface 433. At least one vacuum port 434 is provided in the cavity mold 430 for applying a vacuum to the cavity 432. A 2D glass-containing sheet 436 to be formed into a 3D article is placed on the cavity mold 420. Features such as alignment pins may be used to precisely place the 2D glass-containing sheet 436 on the cavity mold 430. Vacuum is applied to the cavity 432 to sag the 2D glass-containing sheet 436 into the cavity 432 and thereby form the 3D article. The 2D glass-containing sheet 436 can also be allowed to sag partly into the cavity by gravity. Then, the vacuum can be applied to completely sag the 2D glass-containing sheet 436 into the cavity and thereby form the 3D article. A heater 438 is provided to heat the mold 430. The mold 430 need not be as hot as the 2D glass-containing sheet 436, which when placed on the mold 430 has a temperature in the second temperature range.

Figure 5:
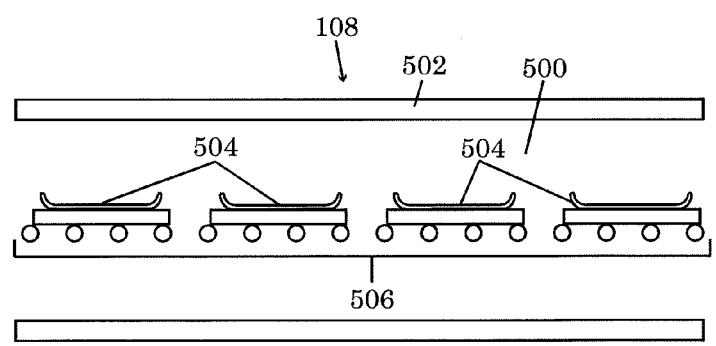
FIG. 5 is a detailed diagram of a cooling section.

In FIG. 5, the cooling section 108 includes a cooling chamber 500 surrounded by a muffle 502. The muffle 502 is made of an insulating material and controls the rate of heat loss from the cooling chamber 500 when one or more 3D articles 504 are in the cooling chamber 500. The muffle 502 may be equipped with heating elements to prevent rapid or nonuniform loss of heat from the 3D articles 504 in the cooling chamber 500. A conveyor 506, such as a roll conveyor or any other suitable linear travel mechanism, is disposed in the cooling chamber 500 to transport the 3D articles 504 along the cooling chamber 500. The 3D articles 504 are loaded into the upstream end (left end) of the cooling chamber 500 from the forming section 106 and unloaded from the downstream end (right end) of the cooling chamber 500.

Figure 6A:
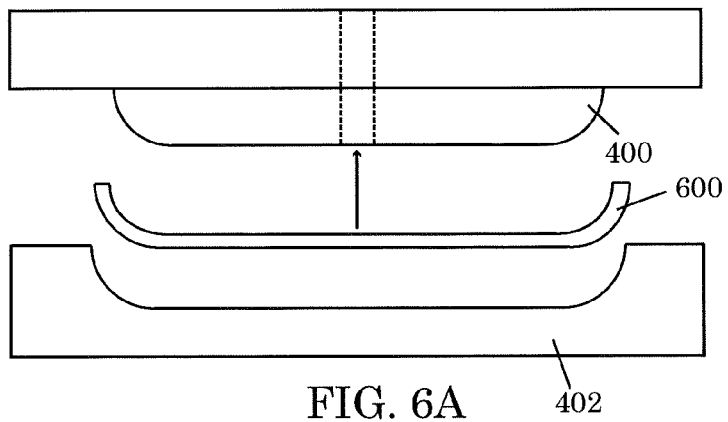
FIG. 6A shows a step in a method of unloading a 3D article from a pressing mold arrangement.
Figure 6B:
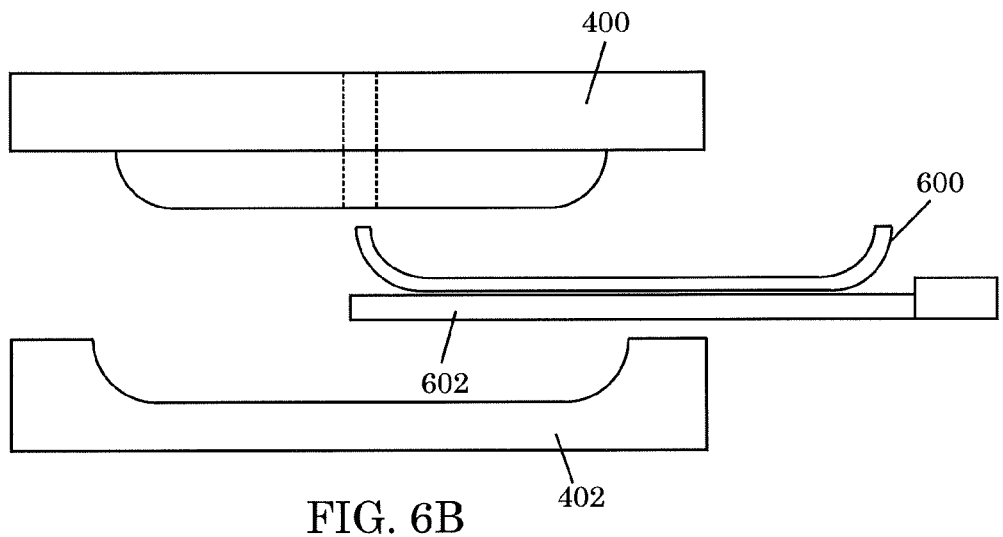
FIG. 6B shows another step in a method of unloading a 3D article from a pressing mold arrangement.
Figure 7:
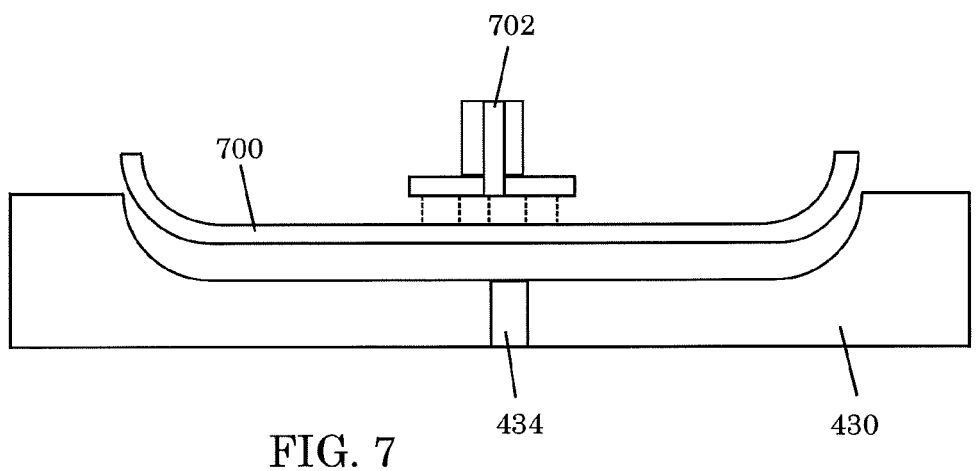
FIG. 7 shows a method of unloading a 3D article from a sag mold.

In FIGS. 6A and 6B, a method of unloading a 3D article 600 from the pressing mold arrangement shown in FIG. 4A includes clamping the 3D article 600 to the plunger mold 400 by vacuum. A support 602 is placed below the 3D article 600. Then, the clamping vacuum is removed to release the 3D article 600 onto the support 602. The 3D article 600 is allowed to cool off slightly before it is unloaded so that stickiness between the support 602 and the 3D article 600 is avoided. In addition, the surface of the support 602 may be made of or coated with a suitable non-sticky material. The support 602 and 3D article 600 can be placed on the conveyor (506 in FIG. 5) in the cooling chamber (500 in FIG. 5). An unloading method similar to the one shown in FIGS. 6A and 6B can also be used for the pressure forming mold arrangement shown in FIG. 4B. In FIG. 7, a method of unloading a 3D article 700 from the sag mold 430 (previously shown in FIG. 4C) includes grabbing the 3D article with a vacuum chuck 702. The 3D article 700 can be released onto a support, such as 602 in FIG. 6B, and the support and 3D article 700 can be transferred to the cooling chamber (500 in FIG. 5).

The apparatus and method described above allows high-quality 3D articles to be formed from 2D glass-containing sheets at high speeds, e.g., up to around six 3D articles per minute per mold system. Use of a pneumatic bearing system to support the 2D glass-containing sheet in a heating chamber allows the surface quality of the 2D glass-containing sheet to be maintained while the 2D glass-containing sheet is heated in the heating chamber. The number of mold systems needed in the apparatus and method described above is the same as the number of forming stations. Thus, for example, if the apparatus includes four forming stations, only four mold systems would be needed. With a small number of mold systems, 3D articles can be produced substantially continuously from 2D glass-containing sheets using the apparatus and method described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for mass producing 3D articles from 2D glass-containing sheets, comprising:
   a heating section comprising a heating station, the heating station comprising a heating chamber adapted to receive a 2D glass-containing sheet, a pneumatic bearing system proximate to the heating chamber for suspending the 2D glass-containing sheet inside the heating chamber, and a heater system proximate to the heating chamber for supplying heat to the heating chamber;
   a pair of actuators operatively coupled to the heating chamber, the actuators having a spacing between them in which a select heating area of the heating chamber having a length smaller than a total length of the heating chamber is located, wherein each 2D glass-containing sheet received in the heating chamber is constrained within the select heating area while being heated in the heating chamber, wherein the actuators are configured to be controlled such that a length of the spacing is greater than a length of each 2D glass-containing sheet to be constrained in the spacing;
   a forming section downstream of the heating section, the forming section comprising a forming station, the forming station comprising a mold system adapted to shape a heated 2D glass-containing sheet into a 3D article; and
   a cooling section downstream of the forming section, the cooling section comprising a cooling chamber adapted to controllably cool off one or more 3D articles.

2. The apparatus of claim 1, further comprising a preheating section upstream of the heating section, the preheating section comprising a preheating chamber adapted to receive one or more 2D glass-containing sheets and a heating system proximate to the preheating chamber for supplying heat to the preheating chamber.

3. The apparatus of claim 2, further comprising a conveyor disposed inside the preheating chamber for moving the one or more 2D glass-containing sheets along the preheating chamber.

4. The apparatus of claim 2, further comprising means for transferring a preheated 2D glass-containing sheet from the preheating section to the heating section, means for transferring a heated 2D glass-containing sheet from the heating section to the forming section, and means for transferring a 3D article from the forming section to the cooling section.

5. The apparatus of claim 1, further comprising a conveyor disposed inside the cooling chamber for moving the one or more 3D articles along the cooling chamber.

6. The apparatus of claim 1, further comprising means for transferring a heated 2D glass-containing sheet from the heating section to the forming section and means for transferring a 3D article from the forming section to the cooling section.

7. The apparatus of claim 6, wherein the means for transferring a heated 2D glass-containing sheet from the heating section to the forming section includes a mechanism for selectively creating a pneumatic ram effect in the heating chamber that ejects the heated 2D glass-containing sheet from the heating chamber.

8. The apparatus of claim 7, wherein the mechanism for selectively creating a pneumatic ram effect comprises a door, shutter, or gate mounted at an inlet of the heating chamber, the door, shutter, or gate being operable to open or close the inlet of the heating chamber.

9. The apparatus of claim 1, wherein the pneumatic bearing system comprises a pair of opposed pneumatic bearings and the heating system comprises a pair of opposed heaters.

10. The apparatus of claim 1, wherein the heating section comprises at least one additional heating station and means for transferring a heated 2D glass-containing sheet from one heating station to another heating station.

11. The apparatus of claim 1, wherein the forming section comprises at least one additional forming station.

12. The method of claim 11, wherein the forming stations are mounted on a rotatable support to enable selective alignment of each forming station with the heating section.

13. The apparatus of claim 1, wherein the mold system comprises a first mold having a cavity defined by a first 3D surface.

14. The apparatus of claim 13, wherein at least one vacuum port is provided in the mold for applying vacuum to the first 3D surface.

15. The apparatus of claim 13, wherein the mold system comprises a second mold having a protrusion defined by a second 3D surface, the protrusion being adapted to be received in the cavity defined by the first 3D surface.

16. The apparatus of claim 15, wherein at least one vacuum port is provided in at least one of the first and second molds for applying vacuum to at least one of the first and second 3D surfaces.

17. A method of mass producing 3D articles from 2D glass-containing sheets, comprising:
   (a) loading a 2D glass-containing sheet into a preheating chamber and heating the 2D glass-containing sheet to a first temperature;
   (b) transferring the preheated 2D glass-containing sheet from the preheating chamber into a heating chamber, suspending the preheated 2D glass-containing sheet inside the heating chamber by pneumatic pressure, and heating the preheated 2D glass-containing sheet to a second temperature higher than the first temperature;
   (c) ejecting the heated 2D glass-containing sheet from the heating chamber into a mold system and forming the heated 2D glass-containing sheet into a 3D article in the mold system;
   (d) unloading the 3D article from the mold system into a cooling chamber and controllably cooling off the 3D article to a third temperature lower than the second temperature;
   (e) repeating the preceding steps (a) through (d) for at least another 2D glass-containing sheet; and
   (f) prior to the transferring of step (b), locating a select heating area of the heating chamber having a length smaller than a total length of the heating chamber in a spacing between a pair of actuators operatively coupled to the heating chamber and constraining each 2D glass-containing sheet received in the heating chamber to the select heating area during the heating of step (b), wherein the pair of actuators is stationary during the heating of step (b) such that each 2D glass-containing sheet is restricted to the same select heating area during the heating of step (b).

18. The method of claim 17, wherein forming of step (c) comprises one of pressing, vacuum sagging, and pressure forming the heated 2D glass-containing sheet.

19. The method of claim 17, wherein unloading of step (d) comprises (i) vacuum clamping the 3D article to a mold surface, releasing the 3D article onto a support, and transferring the support and 3D article to the cooling chamber or (ii) grabbing the 3D article with a vacuum chuck, releasing the 3D article onto a support, and transferring the support and 3D article to the cooling chamber.

20. The method of claim 17, further comprising coordinating timing of steps (a) through (d) such that 3D articles are produced from 2D glass-containing sheets substantially continuously over a selected time period.

21. The method of claim 17, wherein the ejecting of step (c) comprises (i) retracting one of the actuators to open a pathway for ejection of the 2D glass-containing sheet from the heating chamber and (ii) after opening the pathway, moving an opening at a first end of the heating chamber from an unsealed position to a sealed position to create a pneumatic ram effect within the heating chamber that ejects the 2D glass-containing sheet through a second end of the heating chamber.

22. A method of mass producing 3D articles from 2D glass-containing sheets, comprising:
   (a) loading a 2D glass-containing sheet into a preheating chamber and heating the 2D glass-containing sheet to a first temperature;
   (b) transferring the preheated 2D glass-containing sheet from the preheating chamber into a heating chamber, suspending the preheated 2D glass-containing sheet inside the heating chamber by pneumatic pressure, and heating the preheated 2D glass-containing sheet to a second temperature higher than the first temperature;
   (c) ejecting the heated 2D glass-containing sheet from the heating chamber into a mold system and forming the heated 2D glass-containing sheet into a 3D article in the mold system;
   (d) unloading the 3D article from the mold system into a cooling chamber and controllably cooling off the 3D article to a third temperature lower than the second temperature;
   (e) repeating the preceding steps (a) through (d) for at least another 2D glass-containing sheet; and
   (f) controlling a pair of actuators disposed in the heating chamber to define a select area within the heating chamber and constraining each 2D glass-containing sheet to the select area during the heating of step (b);
wherein the controlling of step (f) comprises defining the select area in a spacing between the actuators and selecting a length of the spacing to be about 5% to 35% greater than a length of each 2D glass-containing sheet.

* * * * *